C. T. CURTIS.
HORSE HOE.
APPLICATION FILED JULY 23, 1910.

976,641.

Patented Nov. 22, 1910.
2 SHEETS—SHEET 1.

Witnesses
J. H. Crawford
Wm. Bagger

Inventor
Clarence T. Curtis,
By Victor J. Evans
Attorney

C. T. CURTIS.
HORSE HOE.
APPLICATION FILED JULY 23, 1910.

976,641.

Patented Nov. 22, 1910.
2 SHEETS—SHEET 2.

Witnesses
J. C. Crawford.
Wm. Bagger.

Inventor
Clarence T. Curtis,
By Victor J. Evans
Attorney

UNITED STATES PATENT OFFICE.

CLARENCE T. CURTIS, OF WASHINGTON, MAINE.

HORSE-HOE.

976,641.

Specification of Letters Patent. Patented Nov. 22, 1910.

Application filed July 23, 1910. Serial No. 573,381.

*To all whom it may concern:*

Be it known that I, CLARENCE T. CURTIS, a citizen of the United States of America, residing at Washington, in the county of Knox and State of Maine, have invented new and useful Improvements in Horse-Hoes, of which the following is a specification.

This invention relates to horse hoes to be used for hilling potatoes and other crops, and it has for its object to produce a device of this class which shall possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

Figure 1:
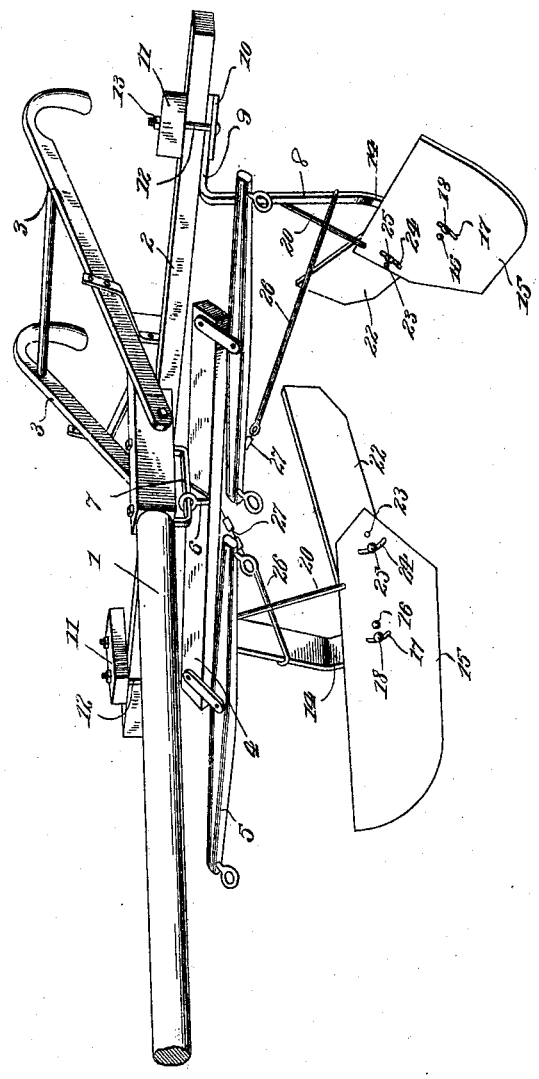
Figure 2:
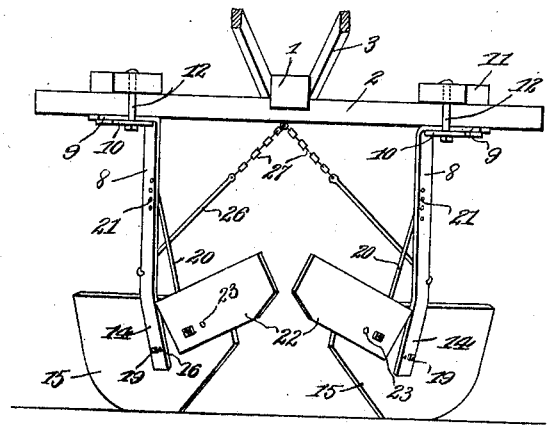
Figure 3:
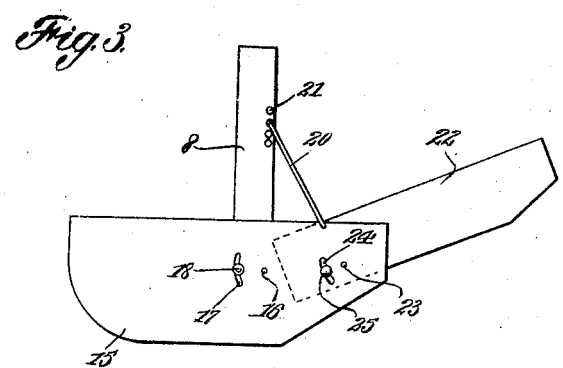
Figure 4:
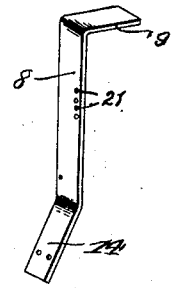
Figure 5:
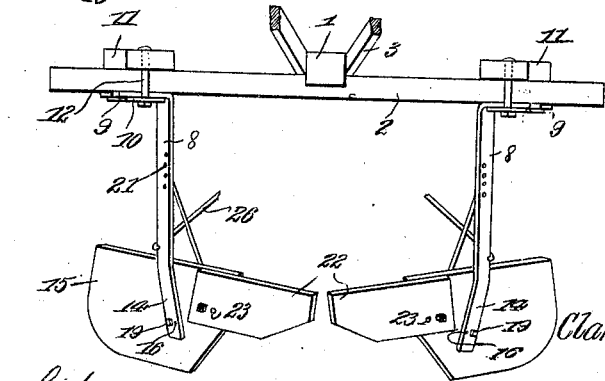

In the drawings,—Figure 1 is a perspective view of a horse hoe constructed in accordance with the invention. Fig. 2 is a rear elevation of the same. Fig. 3 is a front view of one of the standards with the blades attached thereto. Fig. 4 is a perspective detail view, showing one of the standards detached. Fig. 5 is a detail view in rear elevation, showing the earth engaging blades arranged differently than in Fig. 2.

Corresponding parts in the several figures are denoted by like characters of reference.

In the construction of the improved implement there is provided a tongue 1 upon which a cross bar 2 is firmly secured, said cross bar being arranged adjacent to the rear end of the tongue. The latter is provided with guiding handles 3 and with a draft attachment including an evener 4 and whiffletrees 5, the evener being connected by an eye bolt 6 with a staple 7 upon the underside of the tongue to which draft may thus be applied in the customary manner.

Two standards are provided each consisting of a metallic bar of suitable dimensions, said bar, which is designated by 8, being bent adjacent to its upper end so as to form an arm or bracket 9. The arms or brackets 9 of the standards, which lie adjacent to the underside of the cross bar 2, are securely connected with the latter by means of clamping devices including bottom plates 10 and top plates 11, the same being connected together by fastening bolts 12, thereby clamping the arms 9 securely between the bottom plates and the cross bar 2, it being readily observed, however, that by loosening the nuts 13 upon the bolts 12, the clamping devices may be moved or shifted upon the cross bar, thus securing the standards at various distances from the central portion where the tongue is connected with said cross bar. The lower ends of the standard bars 8 are bent to form obliquely disposed forwardly extending seat members 14 upon which the hoe blades 15 are mounted.

The blades 15 are pivotally secured upon the seat members 14 by means of fastening members such as rivets 16, and said hoe blades are provided with slots 17 concentric with the pivotal members 16 for the passage of fastening bolts 18 that extend through the seat members 14 and are provided with nuts 19, whereby the parts may be secured together at various adjustments, thus enabling the hoe blades 15 to be tilted to various positions within the range of the length of the arcuate slots 17. For the purpose of additionally securing the hoe blades 15 at the desired adjustments, braces 20 are provided, said braces being pivotally connected with the hoe blades adjacent to the upper edges of the latter, and said braces being provided with terminal hooks adapted to engage one of a series of perforations 21 in the bar or standard 8.

Each of the hoe blades 15 carries an auxiliary blade 22 pivoted thereon at 23 and having an arcuate slot 24 for the passage of a fastening bolt 25, whereby the auxiliary blade 22 may be securely held at various adjustments. Suitably connected with the standards 8 are braces each comprising a rod 26 and a short chain 27, the chains 27 being connected with the draft member or evener 4. The latter, as previously stated, is slidably connected with the keeper 7 upon the underside of the draft pole. In other words, when the standards are moved outwardly upon the cross bar 2, the eye engaging the keeper 7 will obviously be drawn in a rearward direction upon said keeper; when the standards are moved inwardly, the eye bolt supporting the evener will move forwardly upon the keeper, and the draft will thus at all times be effectively applied.

From the foregoing description, taken in connection with the drawings hereto annexed, the operation and advantages of this invention will be readily understood by those skilled in the art to which it appertains. It will be readily seen that the blade carrying standards may be adjusted to suit different conditions and various crops. The hoe blades with the auxiliary blades may be adjusted so as to scrape the dirt in the direction of a center ridge or hill, and the shape or contour of the latter may be governed by the adjustment of the auxiliary blades, as will be readily understood. Thus by proper adjustment of the blades the ridge may be formed with narrow shallow channels or ditches, wherein moisture will readily accumulate, being supplied therefrom directly to the roots of the plants.

This improved hoe is especially serviceable for hilling and cultivating potatoes, but it may be successfully and advantageously used for other crops.

Having thus described the invention, what is claimed as new, is:—

1. In a horse hoe, a tongue, a cross bar upon said tongue, blade carrying standards adjustably connected with the cross bar, a keeper depending from the tongue, a draft evener slidably connected with the keeper, and braces including flexible members connecting the blade carrying standards with the draft evener.

2. In a device of the character described, a tongue having a cross bar and provided with a downwardly extending keeper, standards adjustably mounted upon the cross bar, said standards consisting each of a bar having a rearward extending arm at its upper end and an obliquely disposed seat at its lower end, clamping means engaging the arms of the standard for securing the latter upon the cross bar, hoe blades pivoted upon the seats at the lower ends of the standards, auxiliary blades pivoted upon the hoe blades, and means for securing the blades and the auxiliary blades at various adjustments.

3. In a device of the character described, the combination with a frame including a tongue and a cross bar, of standards adjustably connected with the cross bar, hoe blades pivoted upon said standards, and means for securing the hoe blades at various adjustments, said means including rods pivotally connected with the hoe blades and having terminal hooks adapted for engagement with apertures in the standards.

In testimony whereof I affix my signature in presence of two witnesses.

CLARENCE T. CURTIS.

Witnesses:
WILLIAM H. MILLER,
GRACIE M. CURTIS.